(12) United States Patent
Torkelson et al.

(10) Patent No.: US 10,414,878 B2
(45) Date of Patent: *Sep. 17, 2019

(54) ENHANCING THE PHYSICAL PROPERTIES OF SEMI-CRYSTALLINE POLYMERS VIA SOLID STATE SHEAR PULVERIZATION

(71) Applicant: Northwestern University, Evanston, IL (US)

(72) Inventors: John M. Torkelson, Skokie, IL (US); Cynthia Pierre, Chicago, IL (US); Amanda Flores Walker, Mt. Vernon, IN (US); Philip J. Brunner, South Milwaukee, WI (US)

(73) Assignee: Northwestern University, Evanston, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/877,102

(22) Filed: Jan. 22, 2018

(65) Prior Publication Data

US 2018/0244861 A1   Aug. 30, 2018

Related U.S. Application Data

(60) Continuation of application No. 14/434,692, filed as application No. PCT/US2013/064855 on Oct. 14, 2013, now Pat. No. 9,873,770, which is a continuation-in-part of application No. 14/279,521, filed on May 16, 2014, now Pat. No. 9,133,311, which is a division of application No. 13/854,558, filed on Apr. 1, 2013, now Pat. No. 8,729,223, which is a division of application No. 12/322,396, filed on Feb. 2, 2009, now Pat. No. 8,410,245.

(60) Provisional application No. 61/712,982, filed on Oct. 12, 2012, provisional application No. 61/063,036, filed on Jan. 31, 2008.

(51) Int. Cl.
*C08J 3/12* (2006.01)
*C08G 63/88* (2006.01)

(52) U.S. Cl.
CPC .............. *C08J 3/12* (2013.01); *C08G 63/88* (2013.01); *C08J 2323/06* (2013.01); *C08J 2323/12* (2013.01); *C08J 2367/02* (2013.01); *C08J 2367/04* (2013.01)

(58) Field of Classification Search
CPC ...... C08J 3/12; C08J 2367/02; C08J 2367/04; C08J 2323/06; C08J 2323/12; C08G 63/88

See application file for complete search history.

(56) References Cited

U.S. PATENT DOCUMENTS

| 5,397,065 A | 3/1995 | Shutov et al. |
| 5,814,673 A | 9/1998 | Khait |

(Continued)

FOREIGN PATENT DOCUMENTS

EP    0596835 B1   5/1994

OTHER PUBLICATIONS

Lebovitz, A.H. et al., "Stabilization of Dispersed Phase to Static Coarsening: Polymer Blend Compatibilization via Solid-State Shear Pulverization", Macromolecules 2002, 35, 8672-8675.

(Continued)

*Primary Examiner* — Frances Tischler
(74) *Attorney, Agent, or Firm* — Bell & Manning LLC

(57) ABSTRACT

Solid-state shear pulverization of semi-crystalline polymers and copolymers thereof and related methods for enhanced crystallization kinetics and physical/mechanical properties.

11 Claims, 14 Drawing Sheets

(56) References Cited

U.S. PATENT DOCUMENTS

| | | |
|---|---|---|
| 6,180,685 B1 | 1/2001 | Khait |
| 7,223,359 B2 | 5/2007 | Tokelson et al. |
| 2003/0230824 A1 | 12/2003 | Furgiuele et al. |

OTHER PUBLICATIONS

Lebovitz, A.H. et al., "In Situ Block Copolymer Formation during Solid-State Shear Pulverization: An Explanation for Blend Compatibilization via Interpolymer Radical Reactions", Macromolecules, 2002, 35, 9716-9722.

Lebovitz, A.H. et al., "Sub-micron Dispersed-Phase Particle Size in Polymer Blends: Overcoming the Taylor Limit via Solid-State Shear Pulverization", Polymer, 44, (2003), 199-206.

Tao, L. et al., "Compatibilizing Effects of Block Copolymer Mixed with Immiscible Polymer Blends by Solid-State Shear Pulverization: Stabilizing the Dispersed Phase to Static Coarsening", Polymer, 46, (2005), 4753-4761.

Tao, Y. et al., "Achievement of Quasi-Nanostructured Polymer Blends by Solid-State Shear Pulverization and Compatibilization by Gradient Copolymer Addition.", Polymer, 47, (2006), 6773-6781.

Koerner, H. et al., "Montmorillonite-Thermoset Nanocomposites via Cryo-Compounding", Polymer, 47, (2006), 3426-3435.

Walker, A.M. et al., "Polyethylene/Starch Blends with Enhanced Oxygen Barrier and Mechanical Properties: Effect of Granule Morphology Damage by Solid-State Shear Pulverization", Polymer, 48, (2007), 1066-1074.

Wang, Q. et al., "A Study on the Pan-Milling Process and the Pulverizing Efficiency of Pan-Mill Type Equipment", Polymer Engineering and Science, Jun. 1997, vol. 37, No. 6, pp. 1009-1101.

Furgiuele, N. et al., "Efficient Mixing of Polymer Blends of Extreme Viscosity Ratio: Elimination of Phase Inversion via Solid-State Shear Pulverization", Polymer Engineering and Science, Jun. 2000, vol. 40, No. 6, pp. 1447-1457.

Pantoustier, N. et al., "Biodegradable Polyester Layered Silicate Nanocomposites Based on Poly(E Caprolactone)", Polymer Engineering and Science, Sep. 2002, vol. 42, No. 9, pp. 1928-1937.

Hanley, T.L. et al., "Crystallisation Kinetics of Novel Branched Poly(ethylene terephthalate): A Small-Angle X-ray Scattering Study", Polym Int 55:1435-1443 (2006).

Hanley, T. et al., "A Small-Angle X-ray Scattering Study of the Effect of Chain Architecture on the Shear-Induced Crystallization of Branched and Linear Poly(ethylene terephthalate)", J. Appl. Cryst. (2007). 40, s599-s604.

Ganglani, M. et al., "Trace Levels of Mechanochemical Effects in Pulverized Polyolefins", J. Appl. Polymer Science, vol. 80, 671-679 (2001).

Zhu, Y.G. et al., "Effect of Cryomilling on the Thermal Behaviors of Poly(ethylene terephthalate)", J. of Appl. Polymer Science, vol. 99, 2868-2873 (2006).

Di, Y. et al., "Barrier and Mechanical Properties of Poly(caprolactone)/Organoclay Nanocomposites", Macromol. Symp. 2005, 228, 115-124.

Furgiuele, N. et al., "Novel Strategy for Polymer Blend Compatibilization: Solid-State Sheear Pulverization", Macromolecules, vol. 33, No. 2, Jan. 25, 2000, pp. 220-228.

Smith, A.P. et al., "Cryogenic Mechanical Alloying of Poly(methyl methacrylate) with Polyisoprene and Poly(ethylene-alt-propylene)", Macromolecules, 2000, 33, 2595-2604.

Nogales, et al., "Shear-induced crystallization of isotactic polypropylene with different molecular weight distributions: in situ small- and wide-angle X-ray scattering studies", Polymer, 2001, vol. 42, pp. 5247-5256.

U.S. Appl. No. 14/434,692, filed Apr. 9, 2015.
U.S. Appl. No. 14/279,521, filed May 16, 2014.
U.S. Appl. No. 854,558, filed Apr. 1, 2013.
U.S. Appl. No. 12/322,396, filed Feb. 2, 2009.

Iso. Temp. = 120 °C ent of PP during cryomilling.
ENHANCING THE PHYSICAL PROPERTIES OF SEMI-CRYSTALLINE POLYMERS VIA SOLID STATE SHEAR PULVERIZATION This application is a continuation of and claims priority to and the benefit of application Ser. No. 14/434,692 filed Apr. 9, 2015 and issued as U.S. Pat. No. 9,873,770 on Jan. 23, 2018, which claimed priority to and the benefit of International Application no. PCT/US2013/064855 filed Oct. 14, 2013 and prior provisional application Ser. No. 61/712,982 filed Oct. 12, 2012 and was a continuation in part of application Ser. No. 14/279,521 filed May 16, 2014 and issued as U.S. Pat. No. 9,133,311 on Sep. 15, 2015, which was a divisional of and claimed priority to and the benefit of application Ser. No. 13/854,558 filed Apr. 1, 2013 and issued as U.S. Pat. No. 8,729,223 on May 20, 2014, which was a divisional of and claimed priority to and the benefit of application Ser. No. 12/322,396 filed Feb. 2, 2009 and issued as U.S. Pat. No. 8,410,245 on Apr. 2, 2013, which claimed priority to and the benefit of provisional application Ser. No. 61/063,036 filed Jan. 31, 2008—each of which is incorporated herein by reference in its entirety.

BACKGROUND OF THE INVENTION

Solid-state processing methods, such as ball milling, mechanical alloying, pan milling, and solid-state shear pulverization, have recently been employed to achieve intimate mixing of blends and nanocomposites, leading in some cases to materials that cannot be produced via conventional processing methods. Vaia and co-workers demonstrated, through the use of cryo-compounding, the ability to reduce the tactoid/agglomerate size of organically modified montmorillonite in epoxy-organoclay nanocomposites. (See Koerner, H.; Misra, D.; Tan, A.; Drummy, L.; Mirau, P.; Vaia, R Polymer, 2006, 47, 3426-3435.) Smith et al. produced blends where the dispersed phase in poly(methyl methacrylate) and polyisoprene or poly(ethylene-alt-propylene) were on the order of nanometers with the use of cryogenic mechanical alloying. (See Smith, A. P.; Ade, H.; Balik, C. M.; Koch, C. C.; Smith, S. D.; Spontak, R. J. Macromolecules 2000, 33, 2595-2604.) In contrast to these batch processes, solid-state shear pulverization (SSSP), a continuous, industrially applicable process, has resulted in intimate mixing and excellent dispersion in immiscible polymer blends, in some cases yielding 100-200 nm dispensed-phase domain diameters in a polymer matrix. (See, e.g., N. Furgiuele, A. H. Lebovitz, K. Khait, and J. M. Torkelson, Polym. Eng. Sci., 40, 1447 (2000); N. Furgiuele, A. H. Lebovitz, K. Khait, and J. M. Torkelson, Macromolecules, 33, 225 (2000); A. H. Lebovitz, K. Khait, and J. M. Torkelson, Macromolecules, 35, 8672 (2002); A. H. Lebovitz, K. Khait, and J. M. Torkelson, Macromolecules, 35, 9716 (2002); A. H. Lebovitz, K. Khait, and J. M. Torkelson, Polymer, 44, 199 (2003); Y. Tao, A. H. Lebovitz, and J. M. Torkelson, Polymer, 46, 4753 (2005); Y. Tao, J. Kim, and J. M. Torkelson, Polymer, 47, 6773 (2006); A. M. Walker, Y. Tao, and J. M. Torkelson, Polymer; 48, 1066 (2007); each of which is incorporated herein by reference.)

While much work involving solid-state processing has focused on heterogeneous systems and mixtures, relatively little has been done on homopolymers. Zhu et al. demonstrated that cryomilling poly(ethylene terephthalate) (PET) results in the amorphization of PET, which leads to deleterious effects on PET physical properties. (See Zhu, Y. G.; Li, Z. Q.; Zhang, D.; Tanimoto, T. J Appl Polym Sci 2006, 99, 2868-2873.) Similar adverse effects were observed for polypropylene (PP) as a result of a decrease in the molecular weight and degree of crystallinity of PP during cryomilling. During a study on the effect of different pan milling processing conditions on the particle size of polystyrene (PS), Wang et al. observed that pan milling PS degrades the polymer. (See Wang, Q.; Cao, J. Z.; Huang, J. G.; Xu, X. Polym Eng Sci 1997, 37, 1091-1101.) Ganglani et al. proved that although chain scission and radical formation may occur during SSSP processing, significant short or long chain branching does not occur in polyolefins. (See Ganglani, M.; Torkelson, J. M.; Carr, S. H.; Khait, K. J Appl Polym Sci 2001, 80, 671-679). Such results suggest SSSP does not alter the macroscopic structure of polymers such as (high density polyethylene) (HDPE) or linear low density polyethylene (LLDPE), i.e., they are not converted to low density polyethylene (LDPE).

Notwithstanding previous efforts undertaken in the context of polymer blends and various batch processes, there is an on-going search in the art to provide efficient, effective solid-state processing of single component polymer systems with attendant enhancement of various performance parameters.

SUMMARY OF THE INVENTION

In light of the foregoing, it is an object of the present invention to provide methods of using solid-state shear pulverization and corresponding pulverization products, heretofore unrealized in the art. It would be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It can be an object of the present invention to use solid-state shear pulverization techniques with single component polymer systems to enhance one or more polymer physical or mechanical properties, such properties including but not limited to Young's modulus, gas barrier, melt viscosity and melt strength properties.

It can be another object of this invention to provide various solid-state shear pulverization-related methods for the preparation and/or modification of a range of semi-crystalline polymer materials.

It can be another object of this invention to provide various solid-state shear pulverization-related methods for the preparation and/or modification of a range of semi-crystalline polymer films, consumer goods and packaging materials.

It can also be an object of the present invention, alone or in conjunction with one or more of the preceding objectives, to provide a range of semi-crystalline homopolymers or crystallizable copolymers thereof characterized by enhanced crystallization kinetics and/or polymer morphology-such polymers prepared absent the presence of nucleating agent or filler components typically associated with the prior art.

Other objects, features, benefits and advantages of the present invention will be apparent from this summary and the following descriptions of certain embodiments, and will be readily apparent to those skilled in the art having knowledge of various polymer physical and mechanical properties and solid-state shear pulverization techniques. Such objects, features, benefits and advantages will be apparent from the above as taken into conjunction with the accompanying examples, data, and all reasonable inferences to be drawn therefrom, alone or with consideration of the references incorporated herein.

In part, the present invention can be directed to a method of affecting crystallization kinetics of a semi-crystalline homopolymer or a crystallizable copolymer thereof. Such a method can comprise providing such a polymer as can comprise less than about 50% crystallinity and as can be substantially absent nucleating agent and/or filler components; applying a mechanical energy thereto through solid-state shear pulverization in the presence of an element of cooling at least partially sufficient to maintain such a polymer in a solid state, such pulverization at least partially sufficient to induce polymer scission and/or nucleation sites within or indigenous to such a polymer. In the context of either a nucleating agent or a filler component, the phrase "substantially absent" can be considered with reference to crystallization kinetics, mechanical properties and/or corresponding polymer physical properties or morphologies of the sort described herein, in conjunction with this invention, such kinetics or properties as can be realized without such nucleating agent or filler components, in trace or insignificant amounts or in amounts less than would otherwise be understood in the art as required to achieve such effects.

In certain embodiments, a crystallization kinetic effect can be selected from increased onset, peak and endset crystallization temperatures and/or reduced isothermal crystallization half-time, such an affect as compared to that of a single homopolymer absent shear pulverization. In certain non-limiting embodiments, such an effect can be realized with a homopolymer selected from polyesters, polyamides and polyolefins. In certain such embodiments, as illustrated below, such a homopolymer can be a polyester, and pulverization can induce scission thereof. In certain other embodiments, such a homopolymer can be a polyamide (e.g., a nylon) or a polyester (e.g., a polyhydroxyalkanoate such as polyhydroxybutyrate, PHB), and pulverization can increase nucleation sites therein. Regardless, without limitation as to kinetic effect or polymer identity, such a pulverized polymer can be melt-processed and/or incorporated into an article of manufacture.

In part, the present invention can be directed to a method of using solid-state shear pulverization to affect a physical and/or mechanical property of a semi-crystalline homopolymer. Such a method can comprise providing a single component comprising a solid semicrystalline homopolymer; introducing such a homopolymer into a solid-state shear pulverization apparatus, such an apparatus as can comprise a cooling component at least partially sufficient to maintain homopolymer solid state; shear pulverizing such a homopolymer, such pulverization at least partially sufficient to affect a mechanical property such as but not limited to gas permeability and/or a physical property such as but not limited to homopolymer spherulite size and/or number and homopolymer rigid amorphous fraction (RAF), such a homopolymer and pulverization as can be substantially absent nucleating agent and/or filler components; and discharging such a shear pulverized homopolymer from the apparatus.

In certain embodiments, pulverization can be used to affect Young's modulus and/or gas permeability of a homopolymer film. In certain non-limiting embodiments, such a homopolymer can be selected from polyesters, polyamides and polyolefins. Regardless, without limitation as to physical property, mechanical property or polymer identity, such a shear pulverized homopolymer can be melt-processed and/or incorporated into an article of manufacture including but not limited to a packaging material.

In part, the present invention can also be directed to a semi-crystalline polymer, such a polymer the solid-state shear pulverization product of a starting material of such a polymer or crystallizable copolymer thereof, such a pulverization product as can be substantially absent a nucleating agent and/or filler component. Such a pulverization product can be characterized by reduction in crystallite/spherulite size, increase in RAF content and/or an enhanced crystallization kinetic property, such affect and/or enhancement as can be compared to the corresponding property of such a polymer starting material.

In certain embodiments, such a characterized crystallization kinetic property can be an increased crystallization temperature and/or reduced isothermal crystallization half-time. Regardless, such an effect can be characterized for a polymer starting material comprising less than about 50% crystallinity. Such semicrystalline polymer starting materials can be as described elsewhere herein or as would be understood by those skilled in the art. Regardless, a pulverized homopolymer of this invention can be melt-processed and/or incorporated into a range of articles of manufacture including but not limited to films and packaging materials made therefrom—such films as can be characterized by increased RAF content and/or reduced oxygen permeability, as compared to a film of such a homopolymer absent shear pulverization.

The present invention, as illustrated below, can provide a route to new behavior and enhanced properties for semi-crystalline polymers processed by SSSP without additives such as fillers or nucleating agents. Such polymers include, without limitation, polyolefins such as PP, LDPE, LLDPE, HDPE, polyamides (e.g., nylons), polyesters such as PHB and polycaprolactone (PCL), poly(butylene terephthalate) (PBT), and PET. The crystallization kinetics of such polymers can be enhanced without compromising the degree of crystallinity of the polymer. In certain cases, both the crystallinity and the crystallization kinetics are enhanced. Representative of certain non-limiting embodiments of this invention, for LDPE, PCL, PBT, PET, nylon 11 and PHB, significant changes in the crystallization kinetics can occur and enhancements can be observed in the mechanical and barrier properties of such polymers. In some cases, the effects observed are comparable to those generally associated with the addition of nucleating agents or fillers.

DETAILED DESCRIPTION OF CERTAIN EMBODIMENTS

Figure 1:
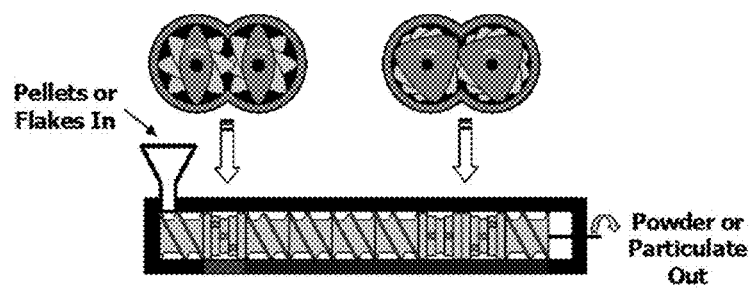
FIG. 1. A schematic illustration of an SSSP apparatus useful in conjunction with one or more methods of this invention.

Representative of certain non-limiting embodiments of this invention, and as discussed more fully below, improved crystallization kinetics, physical and/or mechanical properties of semi-crystalline polymers, e.g., without limitation, polyethylene, polypropylene, polyhydroxybutyrate, polycaprolactone, poly(butylene terephthalate) and poly(ethylene terephthalate) can be realized. While certain data, observations and/or results may be described in conjunction with one or particular mechanisms or phenomena, it will be understood by those skilled in the art that this invention is not limited by anyone theory or mode of operation.

However, such results and/or enhancements can be obtained using SSSP apparatus and processing without the addition of nucleating agents. As discussed below, major benefits from an SSSP apparatus employed in conjunction with the present methodologies relate to the ability to cool or maintain the barrel at a temperature sufficiently low enough to ensure that the polymeric material remains in the solid state during pulverization. These major benefits also relate to the use of tri-lobe and/or bi-lobe screw elements along a portion of the pulverizer screw. Details regarding SSSP processes and equipment (e.g., component construction, screw elements, transport elements, kneading or shearing elements, and spacer elements and/or the sequence or design thereof selected or varied as required to accommodate a polymer starting material, pulverization parameters and/or a resulting pulverized polymer product) are known to those skilled in the art made aware of this invention. (See, e.g., Furgiuele, N.; Lebovitz, A. H.; Khait, K.; Torkelson, J. M. *Macromolecules* 2000, 33, 225-228; Furgiuele, N.; Lebovitz, A. H.; Khait, K.; Torkelson, J. M. *Polym Eng. Sci* 2000, 40, 1447-1457; Lebovitz, A. H.; Khait, K.; Torkelson, J. M. *Macromolecules* 2002, 35, 8672-8675; Kasimatis, K. G.; Torkelson, J. M. *PMSE Prepr* 2005, 92, 255-256; Tao, Y.; Kim, J.; Torkelson, J. M. *Polymer* 2006, 47, 6773-6781; Walker, A. M.; Tao, Y.; Torkelson, J. M. *Polymer* 2001, 48, 1066-1074; Lebovitz, A. H.; Khait, K.; Torkelson, J. M. *Polymer* 2003 44, 199-206; Brunner, P. J.; Clark, J. T.; Torkelson, J. M.; Wakabayashi, K. *Polymer Engineering and Science* 2012, 52, 1555-1564; and U.S. Pat. Nos. 5,814,673; 6,180,685; and 7,223,359—each of which is incorporated herein by reference in its entirety.)

Without limitation, in the context of this invention, SSSP can be conducted in a modified twin-screw extruder from Berstorff (Model ZE 25). It has a length to diameter ratio (L/D) of 26.5, where the first section has a barrel/screw diameter of 25 mm (L/D=19) and remaining section has a diameter of 23 mm (L/D=7.5). The screw elements involved in the 25 mm-section are spiral conveying and bilobe kneading elements, while those in the 23 mm-section are trilobe shearing elements. During operation, the barrels are cooled by a recirculating ethylene glycol/water (60/40 wt/wt) mixture at −7° C. supplied by a Budzar Industries WC-3 chiller, which allows for repeated fragmentation and fusion steps in the solid-state below the glass transition ($T_g$) or melt transition ($T_m$) of the processed polymeric material. For this pulverization instrument, the barrel section with several kneading elements in the upstream portion of the screws is termed the mixing zone. A long conveying zone follows the mixing zone to sufficiently cool the deformed material before intense pulverization takes place downstream in the pulverization zone. With reference to several polymers discussed herein, various screw designs, speeds and feed rates are, without limitation, provided in Table 1.

TABLE 1

| SSSP processing conditions | | | |
|---|---|---|---|
| Sample | Screw Design | Screw Speed (rpm) | Feed Rate (g/hr) |
| PP | P209bs* | 300 | 135 |
| LDPE | CP104# | 300 | 200 |
| LLDEP | CP104 | 300 | 150 |
| HDPE | P241bs+ | 200 | 190 |
| PCL | P209bs | 300 | 30 |
| PBT | P209bs | 250 | 195 |
| PET | P209bs | 250 | 185 |

*P209bs contains 2 forward kneading elements and 7 shearing elements: 4 forward, 2 neutral, and 1 reverse and 12 conveying elements
CP104 contains 4 kneading elements: 2 forward, 1 neutral, and 1 reverse and 7 shearing elements: 4 forward, 2 neutral, and 1 reverse and 10 conveying elements
+P241bs contains 3 kneading elements: 2 forward, 1 reverse and 7 shearing elements: 5 forward, 1 neutral, and 1 reverse and 11 conveying elements More generally, SSSP is not limited to the system described above. Components for accomplishing SSSP include an extruder that is modified with a cooling or heat transfer medium such that materials are retained in the solid state during pulverization. This modification may involve, but is not limited to a cooling system and medium jacketed around the barrel, and/or a cooled screw, and/or a heat transfer system and medium that operates at a temperature above room temperature and is jacketed around the barrel. Pulverization itself is accomplished via the use of an extruder that has bi-lobe elements or tri-lobe elements or a combination of bi- and tri-lobe elements, such that sufficient work can be can be performed on the material in its solid-state to result in the desired reaction.

With reference to FIG. 1, an SSSP apparatus utilizes mixing, conveying, and pulverization zones, each with a different combination of conveying, mixing, and shearing elements. The level of the applied shear stress can be tuned by altering the type of screw applied. For example, using reverse shearing elements results in making the screw "harsher" and increases the residence time in the apparatus; using forward shearing elements results in making the screw less "harsh" and reduces the residence time. The material enters as pellets but exits the pulverizer in the solid state as powder, flakes, or particulate.

More specifically, but indicative of broader aspects of this invention, solid-state shear pulverization processing resulted in enhanced isothermal crystallization rates (as measured by reduced isothermal crystallization half-times) of at least 27% for PP, 85% for LDPE and 92% for PBT. The Young's modulus of PCL increased by 65% after pulverization, and comparable or lesser changes were observed in the other polymers. The oxygen permeability of films made from SSSP processed polymer relative to relative to the unprocessed polymer decreased by 17% for LDPE, 30% for PCL and PBT, and 55% for PET. Such enhancements in physical properties of polymer processed by SSSP can be attributed to changes in the level of crystallinity and/or changes in the shape and size of the spherulites formed during crystallization.

In accordance with certain embodiments of this invention, the SSSP processing of homopolymers resulted in major enhancements in the oxygen barrier properties for a number of polymeric materials including nylon 11, nylon 6, and polyhydroxybutyrate (PHB). When comparing the barrier properties of SSSP-processed materials to those manufactured via conventional methods, like melt-extrusion or batch melt-mixing, significant differences were found: conventional processing shows little to no reduction in the oxygen barrier as compared to the unprocessed, neat polymer pellet. Ultimately, SSSP processing can be used as a novel technique for dramatically improving the barrier properties of a number of polymeric packaging materials. Various other results are provided, below.

Molecular Weight Characterization.

Table 2 provides the molecular weights of PP, LDPE, LLDPE, HDPE, PCL and PBT before and after pulverization as measured by gel permeation chromatography. For PP, LDPE, LLDPE, HDPE and PBT, both the number-average and weight-average molecular weights do not change significantly, suggesting that the polymer chains remain unaffected by SSSP processing. In the study conducted by Ganglani et al., it was demonstrated that molecular structural changes (MW reduction or branching) did not occur to any significant extent when LDPE, LLDPE, and HDPE were processed using low and high shear SSSP processing conditions. Given that the molecular weight distributions of PP, LDPE, LLDPE, and HDPE in the present study were not appreciably altered by SSSP processing, it can be considered that chain scission or branching did not occur in any of these polymers as well.

TABLE 2

Molecular weight averages of polymers before and after SSSP processing

| Sample | $M_n^a \times 10^3$ (g/mol) | $M_w^b \times 10^3$ (g/mol) | PDT$^c$ |
|---|---|---|---|
| PP | 169 | 469 | 2.77 |
| Pulverized PP | 176 | 466 | 2.66 |
| LDPE* | 205 | 282 | 1.37 |
|  | 23.1 | 43 | 1.85 |
| Pulverized LDPE* | 196 | 251 | 1.28 |
|  | 25.3 | 45 | 1.78 |
| LLDPE | 60 | 148 | 2.47 |
| Pulverized LLDPE | 62 | 135 | 2.17 |
| HDPE | 77 | 360 | 4.68 |
| Pulverized HDPE | 76 | 335 | 4.42 |
| PCL | 63.6 | 108 | 1.70 |
| Pulverized PCL | 23.4 | 49 | 2.09 |
| PBT | 42 | 97 | 2.30 |
| Pulverized PBT | 44 | 91 | 2.07 |

*LDPE possessed a bimodal molecular weight distribution
$^a$Number-average molecular weight
$^b$Weight-average molecular weight
$^c$Polydispersity In contrast, PCL undergoes significant chain scission during SSSP processing, which is evident by the nearly factor of 3 reduction in its number-average molecular weight and a factor of 2 reduction in its weight-average molecular weight. As with polystyrene that has been processed by SSSP, the chain scission is most likely caused by the fragmentation and fracture of PCL chains during SSSP processing. (The molecular weight reduction in PCL is believed not associated with hydrolysis of PCL during SSSP processing. This is because the SSSP processing occurs at relatively low temperatures where PCL is in its semi-crystalline state and where hydrolysis of PCL does not occur.) Furgiuele et al. demonstrated that the degree of chain scission that PS and PP undergo can be controlled by the type of screw employed and the initial molecular weight of the polymer. In order to reduce the level of chain scission, a milder screw design can be employed for the pulverization of PCL.

Figure 2:
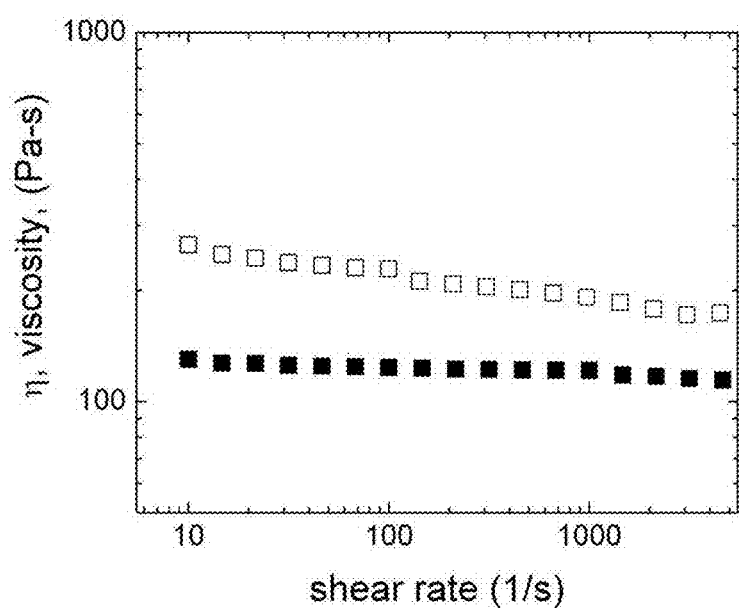
FIG. 2. Shear viscosity of pristine, unprocessed PET (■) and pulverized PET (□) at 280° C. and 100% strain.

The molecular structure of PET before and after SSSP processing was probed through a combination of intrinsic viscosity and melt rheology characterization. The increase in melt viscosity as shown in FIG. 2 after SSSP processing without a related increase in intrinsic viscosity indicates that PET becomes lightly branched during SSSP processing. As such, an accurate characterization of PET molecular weight is not possible, but—as discussed below—the PET molecular structure changes from a linear chain before SSSP processing to a lightly branched chain after SSSP processing.

Crystallization Kinetics.

As shown in Table 3 and 4, pulverization significantly alters the crystallization behaviors of LDPE, PCL, PBT and PET, while those of PP, LLDPE, and HDPE remain the same within experimental error. After SSSP processing, the onset crystallization temperature (measured upon cooling from the melt state), $T_{c,onset}$, increased by 6° C. for both LDPE and PCL, 14° C. for PET and 15° C. for PBT. Comparable changes in $T_{c,onset}$ have been reported upon addition of certain types of fillers to LDPE and upon addition of 4 vol % clay to PCL. (See Chen, B. Q.; Evans, J. R. G. Macromolecules 2006, 39, 747-754.) In the latter case, the increase in $T_{c,onset}$ was attributed by Chen and Evans to the clay platelets acting as nucleating agents, thereby increasing $T_{c,onset}$.

TABLE 3

Crystallization kinetics of pristine and pulverized polymers via onset crystallization from the melt state

| Sample | Crystallization Onset Temperature (° C.) | Percent Crystallinity |
|---|---|---|
| PP | 119 | 44 |
| Pulverized PP | 121 | 46 |
| LDPE | 88 | 23 |
| Pulverized LDPE | 94 | 22 |
| LLDPE | 116 | 39 |
| Pulverized LLDPE | 118 | 42 |
| HDPE | 123 | 78 |
| Pulverized HDPE | 123 | 77 |
| PCL | 31 | 47 |
| Pulverized PCL | 37 | 46 |
| BPT | 185 | 32 |
| Pulverized BPT | 200 | 32 |
| PET | 195 | 13 |
| Pulverized PET | 209 | 32 |

The isothermal crystallization half times of the pristine and pulverized polymers are provided in Table 4. It is clear that pulverization significantly accelerates the isothermal crystallization and thereby reduces the values of pulverized LDPE, LLDPE, PCL, PBT and PET, with notable impact on LDPE (85% reduction of $\tau_c$ 1/2), PCL (71% reduction), PBT (92% reduction) and PET (76% reduction). For semi-crystalline polymers that are highly crystalline (i.e., greater than about 50% crystallinity) and/or readily crystallizable, as in the case of HDPE, pulverization appears to not significantly affect crystallization behavior. In other words, as the crystallizability of the PE increases, the effect of SSSP processing decreases. This provides an explanation for the substantial changes caused by SSSP in the crystallization kinetics of LDPE, while LLDPE and HDPE have mild to null effects.

TABLE 4

Isothermal crystallization half times of pristine and pulverized polymers

| Sample | Isothermal Crystallization Temperature (° C.) | Half Time (min) | Percent Reduction |
| --- | --- | --- | --- |
| PP | 130 | 11 | — |
| Pulverized PP | 130 | 8 | 27 |
| LDPE | 95 | 13 | — |
| Pulverized LDPE | 95 | 2 | 85 |
| LLDPE | 120 | 4 | — |
| Pulverized LLDPE | 120 | 2 | 50 |
| HDPE | 126 | 4 | — |
| Pulverized HDPE | 126 | 4 | 0 |
| PCL | 40 | 7 | — |
| Pulverized PCL | 40 | 2 | 71 |
| BPT | 205 | 39 | — |
| Pulverized BPT | 205 | 3 | 92 |
| PET | 215 | 17 | — |
| Pulverized PET | 215 | 4 | 76 |

Figure 3:
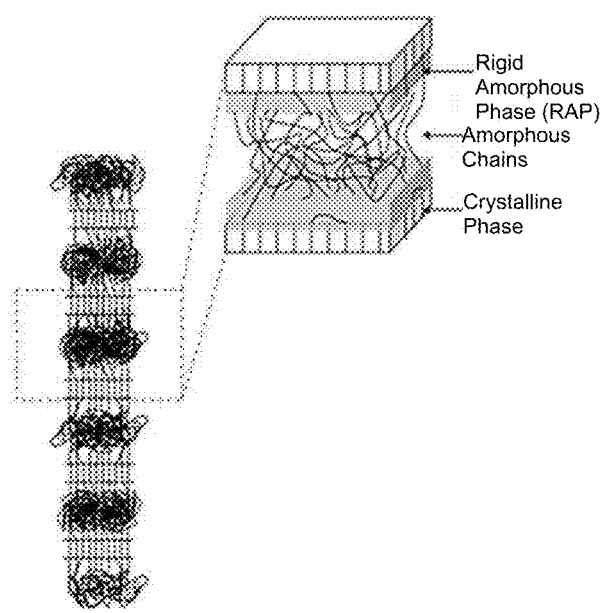
FIG. 3. A schematic illustration of a rigid amorphous fraction (RAF) or phase of a semi-crystalline polymer, as can be considered in the context of certain non-limiting embodiment of this invention.

Without restriction to any theory or mode of operation, certain embodiments of this invention can be considered in conjunction with a rigid amorphous fraction (RAF), a polymer phase which can be used to explain why physical aging decreases with an increase in crystallinity and why the crystalline and amorphous fractions in semi-crystalline polymers did not add up to 100%. (See, Menczel, J.; Wunderlich, B. Heat capacity hysteresis of semicrystalline macromolecular glasses. *J. Polym. Sci.: Polym. Lett. Ed.*, 1981, 19, 261-264.) Present in amorphous regions, the RAF exists at the interface of crystal and amorphous phases as a result of the immobilization of a polymer chain due to the crystal (see FIG. 3). It has been shown that RAF formation can cause significant changes in physical properties. (See, Lin, Y. J.; Dias, P.; Chen, H. Y.; Chum, S.; Hiltner, A.; Baer, E. Oxygen permeability of biaxilly oriented polypropylene films. *Polym. Eng. Sci.* 2008, 48, 642-648.) Specifically, increasing RAF leads to major reductions in oxygen permeability. As discussed herein, modifying the amount of specific energy (Ep) supplied to the polymer by SSSP affects the RAF content of semi-crystalline polymers. With respect to certain such embodiments, overall crystallinity remains constant, while RAF content increases with Ep, leading to major reductions in the oxygen permeability coefficient. For example, the RAF content of nylon 11 compression molded films increases from ~16% for the pellet (no exposure to SSSP) to ~37% for the pulverized sample (Ep ~39 kJ/g), which leads to a ~40% reduction in the oxygen permeability coefficient after SSSP processing. Again, without limitation to theory or operation, such large decreases in oxygen permeability is believed due to the major reduction in crystallite size of the SSSP processed material. The formation of smaller crystallites allows for a larger interface between the crystal and amorphous phases, ultimately resulting in greater immobilization of the amorphous polymer chains and an increased RAF content. Polarized optical microscopy images (not shown) demonstrate that crystallite sizes decrease ~10 fold following pulverization.

Similar trends were found between nylon 11 and PHB with regard to thermal properties. (See, examples 5a-g and the figures referenced therewith.) The non-isothermal differential scanning calorimetry (DSC) tests indicated that as energy input (Ep) increases, the breadth (Onset ° C.–Endset ° C.) of the crystallization peak gets smaller. (See non-isothermal DSC results for PHB and nylon 11 below). This suggests that the crystallization of the material is much more efficient. Nylon 11, in particular, reflected this result. The pellet sample had a crystallization peak breadth of 13° C. whereas the peak breadth for the KW10 sample is merely 6° C. The results of the non-isothermal study also indicate that increasing Ep causes an increase to the crystallization onset, peak, and endset temperatures as compared to the neat pellet. Ultimately, SSSP processing can lead to major enhancements in the crystallizability of PHB and nylon 11.

With regard to the isothermal tests, both materials showed a decrease in crystallization half-time, $\tau_{1/2}$, as Ep increases. (See isothermal DSC results for PHB and Nylon 11 below). For PHB, the $\tau_{1/2}$ went from 6.7 min (for the pellet) to 5.5 min (for the KW10 sample), a 17% decrease. For nylon 11, the $\tau_{1/2}$ went from 17.4 min (for the pellet) to 4.5 min (for the KW10 sample), a 74% decrease. These results demonstrate how SSSP processing alone can greatly enhance the crystallizibility of these homopolymers.

The thermal characterization of the melt-processed/melt-mixed (MM) materials showed even greater enhancements in the crystallizability over neat and SSSP only processed materials. For example, following MM, $\tau_{1/2}$ decreased from 17.4 min for neat nylon 11 pellet to 8.6 min and 5.6 min for the modP209bs sample to 2.6 min, respectively. These results imply that MM alone can improve the efficiency of crystallization for the neat pellet but SSSP prior to MM results in the greatest enhancements.

Optical Microscopy.

Figure 4A:
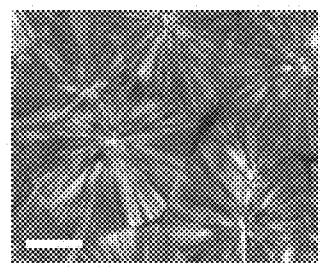
FIGS. 4 A-B. Optical micrographs of A) pristine and B) pulverized PP. Size bar=25 μm.
Figure 4B:
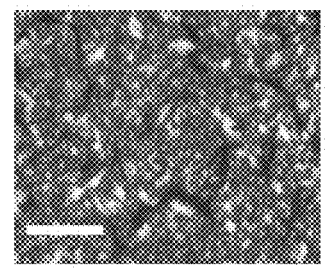

FIG. 4 shows the spherulites of PP and pulverized PP following isothermal crystallization at 130° C. The size of PP spherulites is observed to be significantly reduced in films made from pulverized PP relative to films made from pristine PP. Related changes can occur in other polymers.

Mechanical Properties.

Figure 5:
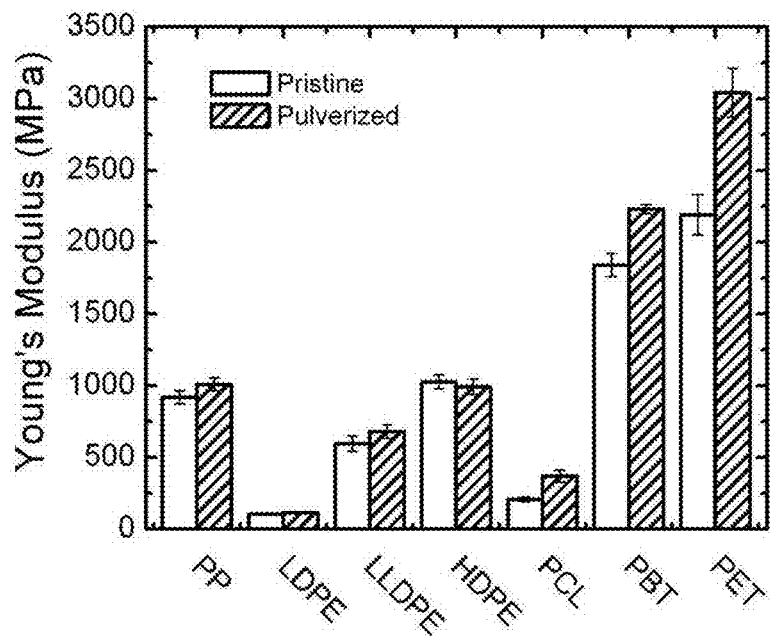
FIG. 5. Young's Modulus of polymers before and after pulverization. All samples except for PCL were tested at a crosshead speed of 50 mm/min and PCL at was tested at 25 mm/min.

FIG. 5 compares the Young's modulus of the pulverized polymers relative to the pristine polymers; the Young's moduli of PP, LDPE, LLDPE, and HDPE remain the same within experimental error after pulverization. Similar results for these polymers were obtained regarding the effect of SSSP on tensile strength and elongation at break. In contrast, for PCL the Young's modulus increased by 65% and the tensile strength by 31% after pulverization. Comparable changes in modulus and tensile strength were observed in PBT and PET after SSSP processing. An approximately 30% decrease in elongation at break was observed after SSSP processing of PCL, which can be attributed to the large reduction in PCL molecular weight accompanying pulverization. Large reductions in elongation at break were measured in PET after SSSP processing, which is due to the enhancement in crystallinity.

The observed improvements in the Young's modulus and tensile of PCL after SSSP processing are greater than results that have been reported in PCL-organoclay nanocomposites. Pantoustier et al. prepared nanocomposites of PCL-organoclay through melt-intercalation and demonstrated a 30% increase in the Young's modulus with the addition of 3 wt % organoclay. (See Pantoustier, N.; Lepoittevin, B.; Alexandre, M.; Kubies, D.; Calberg, C.; Jerome, R.; Dubois, P. Polym Eng Sci 2002, 42, 1928-1937.) A 30% decrease in both the strength and elongation at break of PCL accompanied this increase in the Young's modulus. When a comparable enhancement in the Young's modulus was demonstrated by Di et al. using 5 wt % organoclay, only a 20% increase in the tensile strength of PCL was achieved. The elongation at break of PCL exhibited a 20% reduction. (See Di, Y. W.; Iannac, S.; Sanguigno, L.; Nicolais, L. Macromol Symp 2005, 228, 115-124.)

Oxygen Permeability.

Figure 6:
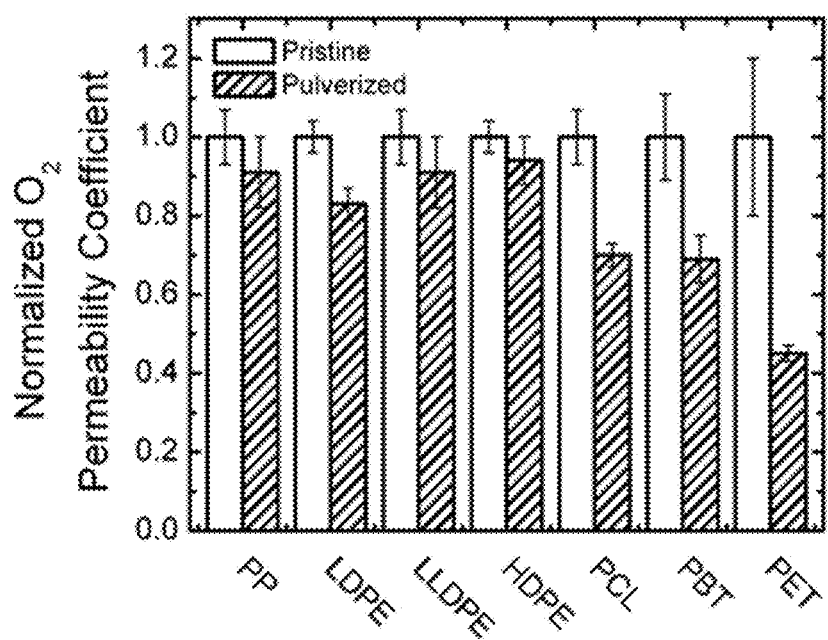
FIG. 6. Normalized oxygen permeability coefficients of polymer before and after pulverization measured at 23° C. and 0% relative humidity.

The effect of pulverization on the barrier properties of the polymer was investigated using oxygen as the permeant; the results are depicted in FIG. 6. Processing by SSSP leads to reductions in oxygen permeability of 17%, 30%, 30% and 55% for LDPE, PCL, PBT and PET films, respectively. Within experimental error, there was a null effect on the barrier properties of PP, LLDPE, and HDPE. The substantial reduction in the oxygen permeability of PET is correlated with the increase in the percent crystallinity of films made from pulverized PET relative to films made from PET not processed by pulverization. Related improvements in the barrier properties of a polymer are known to be achieved with the addition of appropriately dispersed filler. This work indicates that a change in the crystallization kinetics of polymer lacking filler can lead to a decrease in the permeability of the diffusing gas.

EXAMPLES OF THE INVENTION

The following non-limiting examples and data illustrate various aspects and features relating to the polymers and/or methods of the present invention, including the preparation of semi-crystalline polymers as single component systems, as are available through the processing and synthetic methodologies described herein. In comparison with the prior art, the present methods and polymers provide results and data which are surprising, unexpected and contrary thereto. While the utility of this invention is illustrated through the use of several polymers in conjunction with several SSSP parameters and apparatus/element designs, it will be understood by those skilled in the art that comparable results are obtainable with various other polymers, single component systems, pulverization parameters and apparatus/element designs, as are commensurate with the scope of this invention.

Materials.

Polymer starting materials were obtained commercially: including, PP from Atofina with a melt flow index (MFI) of 18 g/10 min, LDPE from Exxon Mobil with a MFI of 70 g/10 min, LLDPE from Equistar Chemicals with a MFI of 3 50 g/min (as determined by a constant pressure capillary flow device), HDPE from Equistar Chemicals with a MFI of 0.8 g/10 min, PCL from Aldrich with a MFI of 1.00 g/10 min, PBT from Aldrich with a reported viscosity average molecular weight of 38,000 g/mol, and PET with an intrinsic viscosity of 0.755 dL/g from Eastman Chemicals. Other polymer starting materials used to illustrate various aspects of this invention are commercially-available from sources well-known to those in the art.

Example 1 SSSP Processing of PET

All polymers were processed using the SSSP apparatus under various processing conditions specified in Table 1. The SSSP apparatus is a commercially available modified Berstorff ZE-25 intermeshing twin-screw extruder equipped with a cooling system set at −7° C. The cooling system allows the polymer to be maintained in the solid state during processing. The diameter of the screw is 25 mm with an aspect ratio, L/D, of 26. A detailed description of the SSSP apparatus can be found the literature (e.g., see Torkelson, Polym. Eng. Sci. 40, 1447 (2000), the entirety of which is incorporated herein by reference).

In order to probe changes in the molecular structure of PET, the rheological properties of pristine and pulverized PET samples were measured using a Rheometrics Scientific ARES strain-controlled rheometer with a 5 cm parallel plate geometry. The samples were subjected to frequency sweeps from 0.1 to 10 Hz at 100% strain. As shown in FIG. 2, an increase in melt viscosity of PET after pulverization was observed.

The increase in melt viscosity of PET after pulverization can result from either an increase in average linear chain molecular weight or in the production of a branched molecular structure accompanying pulverization. Intrinsic viscosity measurements were done on PET samples before and after pulverization, which revealed a slight decrease in intrinsic viscosity accompanying pulverization. For example, for PET pulverized at a screw speed of 250 rpm, the intrinsic viscosity changed from 0.755 dl/g before SSSP to 0.715 dl/g after SSSP. If SSSP resulted in an increase in linear chain molecular weight, this would result in an increase in intrinsic viscosity. A small level of chain scission during SSSP processing (with accompanying polymeric radical formation and reactions) leading to a lightly branched PET molecular structure is consistent with both the melt viscosity and intrinsic viscosity measurements.

Figure 7A:
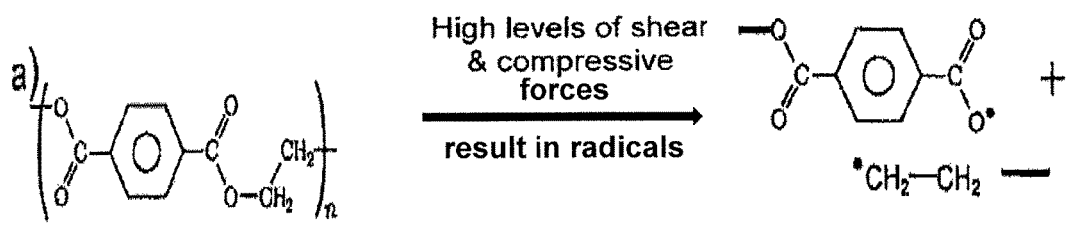
FIGS. 7 A-C. Without limitation a proposed mechanism for the formation of branched PET during SSSP processing. A) Large stresses are concentrated at the weaker C—O bond in the ester linkage, this results in stress-induced scission of the bond. Two radicals form, after C—O bond is cleaved. B) The ethylene radical extracts a hydrogen from a PET chain, which results in a radical along the PET backbone and a dead polymer chain. C) The radical along the PET backbone can recombine with another radical and form branched PET.
Figure 7B:
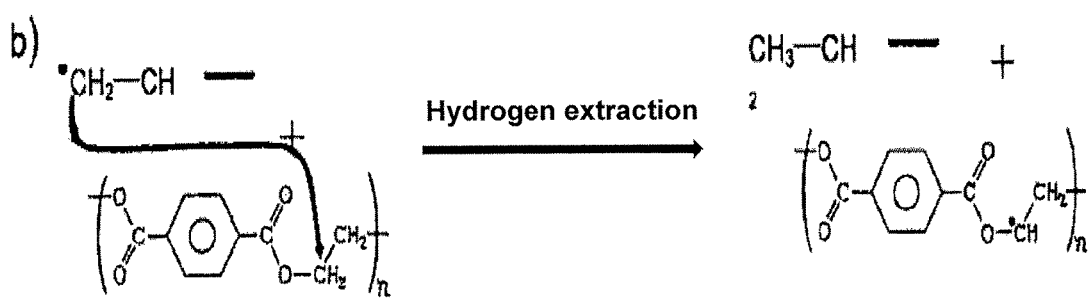
Figure 7C:
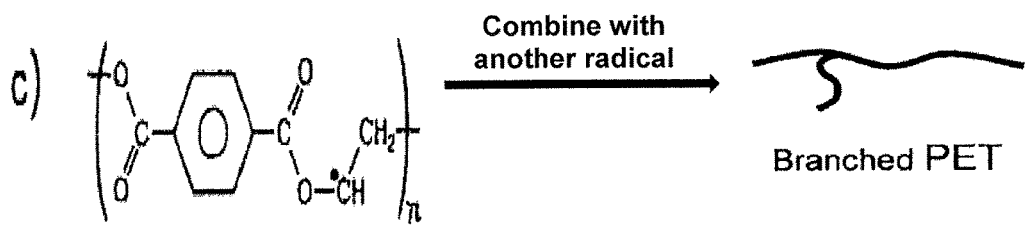

FIG. 7 provides a possible mechanism for the achievement of lightly branched PET after SSSP processing. The application of high levels of shear and 13 compressive forces (mechanical action) can lead to low levels of scission of the weakest bonds in PET, those being C—O backbone bonds. The resulting radicals can participate in hydrogen extraction reactions, leading to the presence of radicals on the backbone of a PET chain. This radical can recombine with another PET radical (likely with a radical located at a chain end), thereby resulting in branched PET. Thus, in situ mechanochemistry accompanying simple SSSP processing of linear PET chains can lead to a lightly branched PET product.

The tensile properties of samples ranging from 0.25 to 0.50 mm in thickness with a cross sectional area of 5 mm by 20 mm were determined using a Sintech 20/G according to ASTM D1708, as known in the art, the entirety of which is incorporated herein by reference. After preparation by compression molding, samples were allowed to equilibrate at room temperature for 2 days prior to testing. All PET samples were tested at room temperature and at a crosshead speed of 50 mm/min. Due to the higher crystallinity level, films made from pulverized PET possess a higher Young's Modulus than films made from pristine PET.

The crystallization behavior was characterized using a Mettler-Toledo DSC 822e with samples weighing 3 to 10 mg. Measurements were taken on the second cycle of heating and cooling at a rate of 10° C./min. For isothermal crystallization characterization, samples were heated above the melt temperature, $T_m$, and then quenched to the respective isothermal crystallization temperature, where the samples were allowed to crystallize for at least 30 min. These results are provided in Tables 3 and 4. After pulverization and as measured by DSC, PET exhibits a factor of 2.5 increase in percent crystallinity. Hanley et al. demonstrated that the presence of branching in PET increases the crystallization rate and can increase crystallinity. (See T. Hanley, D. Sutton, E. Heeley, G. Moad and R. B. Knott, J. Appl. Crystallogr., 2007, 40, s599. And T. L. Hanley, J. S. Forsythe, D. Sutton, G. Moad, R. P. Burford and R. B. Knott, Polym. Int., 2006, 55, 1435.) Thus, the increase in the percent crystallinity of PET after SSSP processing is consistent with a conclusion from the rheology data that branching of PET occurs during pulverization.

In order to characterize oxygen barrier properties, compression molding was used to obtain polymer films that were approximately 0.25 mm thick. An aluminum mask with a permeable area of 5.0 cm$^2$ was used for the analysis of oxygen permeation of the pristine and pulverized films using a MOCON OX-Tran model 2-21MH. Films were measured at 23° C. and 0% relative humidity and conditioned for 1 hour prior to testing. At least four samples were tested for each polymer. As shown in FIG. 6, oxygen permeability decreases by more than 50% in films made from pulverized PET relative to films made from pristine PET. This major improvement in oxygen barrier properties arises from the increase in crystallinity of PET after SSSP processing (pristine PET is 13% crystalline while pulverized PET is 32% crystalline). The crystalline regions are impermeable to and create a torturous path for the diffusing gas or liquid. The increase in path length that the gas must travel results in a decrease in permeability of gases or liquids in the material.

Example 2 SSSP Processing of PBT

All polymers were processed using the SSSP apparatus under various processing conditions specified in Table 1. The SSSP apparatus is a commercially available modified Berstorff ZE-25 intermeshing twin-screw extruder equipped with a cooling system set at −7° C. The cooling system allows the polymer to be maintained in the solid state during processing. The diameter of the screw is 25 mm with an aspect ratio, L/D, of 26. A detailed description of the SSSP apparatus can be found the literature (e.g., see Torkelson, Polym. Eng. Sci. 40, 1447 (2000), the entirety of which is incorporated herein by reference).

In contrast to both PET and PCL, the molecular weight of PBT is not significantly affected by SSSP processing. The PBT samples were all prepped for GPC by weighing 0.08-0.09 g of polymer and dissolving in 2 mL of hexfluroisopropanol. Once dissolved, 0.5 mL of that solution was added to 10 mL of chloroform. The chloroform solution was filtered through 0.2 µm syringe filter. The samples were analyzed by refractive index on an Agilent 1100 series HPLC system at 35° C.

After pulverization of PBT, the onset temperature of crystallization from the melt state increases by 15° C. and the isothermal crystallization halftime at 205° C. is reduced from 39 min to 3 min. These results are consistent with either achievement of 15 very low levels of chain branching that cannot be distinguished via GPC and/or the effective dispersal and increase in number of natural heterogeneous nucleating sites present in the as-received PBT.

After pulverization, the oxygen permeability of films made from PBT decreases by 30% while the Young's modulus increases by 21%.

Example 3 SSSP Processing of PCL

All polymers were processed using the SSSP apparatus under various processing conditions specified in Table 1. The SSSP apparatus is a commercially-available modified Berstorff ZE-25 intermeshing twin-screw extruder equipped with a cooling system set at −7° C. The cooling system allows the polymer to be maintained in the solid state during processing. The diameter of the screw is 25 mm with an aspect ratio, L/D, of 26. A detailed description of the SSSP apparatus can be found the literature (e.g., see Torkelson, Polym. Eng. Sci. 40, 1447 (2000), the entirety of which is incorporated herein by reference).

A Waters Breeze Instrument GPC with tetrahydrofuran as the eluent at 30° C. was used to determine $M_n$, $M_w$, and PDI of PCL. The GPC was equipped with a refractive index (RI) detector (Waters 2410 differential refractometer). The data were calibrated relative to polystyrene standards. PCL undergoes significant chain scission during SSSP processing, which is evident by the nearly factor of 3 reduction in its number-average molecular weight and a factor of 2 reduction in its weight-average molecular weight. In the case of pulverized PCL, this large reduction in molecular weight leads to enhanced crystallization kinetics and to effective dispersal and increase in the density of natural heterogeneous nucleation sites in the as-received PCL, both of which can enhance the mechanical and barrier properties.

After pulverization, the oxygen permeability of films made from PCL decreases by 30% while the Young's modulus increases by 65%.

Example 4 SSSP Processing of Polyolefins

All polymers were processed using the SSSP apparatus under various processing conditions specified in Table 1. The SSSP apparatus is a commercially available modified Berstorff ZE-25 intermeshing twin-screw extruder equipped with a cooling system set at −7° C. The cooling system allows the polymer to be maintained in the solid state during processing. The diameter of the screw is 25 mm with an aspect ratio, L/D, of 26. A detailed description of the SSSP apparatus can be found the literature (e.g., see Torkelson, Polym. Eng. Sci. 40, 1447 (2000), the entirety of which is incorporated herein by reference).

High temperature GPC was employed to determine the number-average and weight-average molecular weights ($M_n$ and $M_w$) and polydispersity indices, PDI, ($M_w/M_n$) of PP, LDPE, LLDPE, and HDPE. The apparatus was a Waters Alliance GPCV 2000 GPC equipped with a Waters DRI detector and viscometer. 1,2,4-trichlorobenzene containing 0.01 wt. % di-tertbutylhydroxytoluene (BHI) was used to elute the column set, which consists of four Waters HI 6E and one Waters HT 2, at 1.0 mL/min at 140° C. Monomodal polyethylene standards from Polymer Standards Service were used to calibrate the data. As shown in Table 2, within experimental error, there is not a change in the molecular weight of these polymers, indicating that the polymers do not undergo a change in their molecular architecture or polymer chain length.

Through sections of PP ranging from 1 to 4 µm obtained using a Leica Ultracut S RMC MI-6000 Ultramicrotome, images of the crystal structure of PP were obtained using a Nikon OPTIPHOT2-POL microscope equipped with a Mettler FP82 hot stage. The samples were heated to 200° C. and then quenched to 130° C., where the samples of PP were allowed to crystallize isothermally. Images were captured every 10 s and the final images obtained are shown in FIG. 4. The size of the spherulites of PP is significantly reduced after pulverization. Given that molecular weights and the mechanical and barrier properties of these polymers are not affected, the enhancement in the crystallization kinetics of PP suggests that during SSSP processing the heterogeneous nucleating agents that are present in the neat, unprocessed polymer are broken down into smaller particles and further distributed throughout the polymer matrix. This increases the nucleation density of PP. The increase in nucleation sites causes more spherulites to begin growing and eventually they impinge the growth of one another, resulting in smaller spherulites after pulverization. Related but lesser effects occur in LLDPE.

Example 5

The crystallizability of certain representative non-limiting single component homopolymers was characterized under isothermal and non-isothermal conditions to illustrate benefits available through the methods of this invention. With respect to Tables 5-8, energy input, $E_p$, was varied by choice of screw design. The P209bs screw design (kneading elements in the mixing zone, shearing elements in the pulverization zone and conveying elements) is as described in conjunction with the data of Table 1 above. The modified P209bs screw design is the same configuration as P209bs, but the pulverization zone contains all forward screw elements. The KW10 screw design contains 7 kneading elements in the mixing zone: 2 forward, 3 neutral and 2 reverse; 7 shearing elements in the pulverization zone: 3 forward, 2 neutral and 2 reverse; and the remaining screw elements were conveying.

Example 5a

TABLE 5

Figure 8:
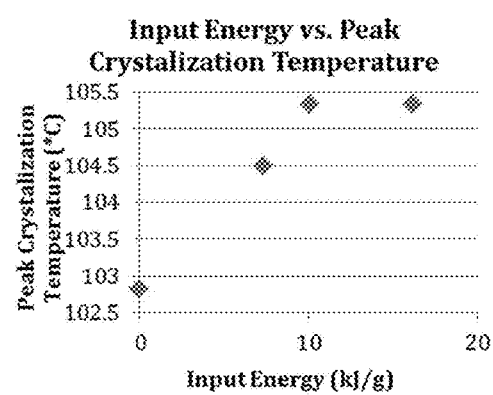
FIGS. 8-15. Graphic presentation of data characterizing isothermal and non-isothermal crystallization properties of several single homopolymers over a range of applied energies, in accordance with certain embodiments of this invention.

Non-Isothermal results for SSSP only PHB samples. Reference is made to the data of FIG. 8.

| Name | Energy Input (kJ/g) | Crystallinity* (%) | Onset (° C.) | Peak (° C.) | Endset (° C.) |
|---|---|---|---|---|---|
| Pellet | 0 | 48.1 | 108 | 103 | 98 |
| SSSP-mod. P209bs | 7.3 | 48.2 | 109 | 105 | 101 |
| SSSP-P209bs | 10.1 | 48.4 | 110 | 105 | 102 |
| SSSP-KW10 | 16.2 | 48.0 | 110 | 105 | 102 |

*Crystallinity = $\Delta H_f/\Delta H_{f,cryst}$ where $\Delta H_f$ is the enthalpy of melting and $\Delta H_{f,cryst}$ is enthalpy of 100% crystalline sample = 146.6 J/g

Example 5b

TABLE 6

Figure 9:
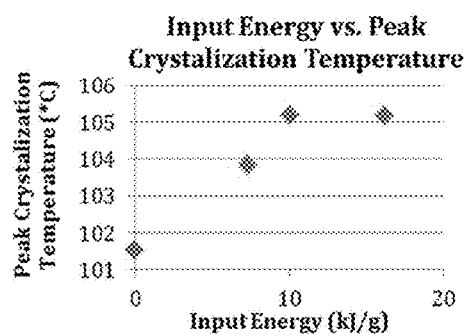

Non-Isothermal results for SSSP/MM PHB samples. Reference is made to the data of FIG. 9.

| Name | Energy Input (kJ/g) | Crystallinity* (%) | Onset (° C.) | Peak (° C.) | Endset (° C.) |
|---|---|---|---|---|---|
| Pellet | 0 | 42.2 | 107 | 102 | 97 |
| SSSP-mod. P209bs | 7.3 | 41.9 | 109 | 104 | 100 |
| SSSP-P209bs | 10.1 | 40.9 | 109 | 105 | 101 |
| SSSP-KW10 | 16.2 | 40.3 | 109 | 105 | 102 |

*Crystallinity = $\Delta H_f/\Delta H_{f,cryst}$ where $\Delta H_f$ is the enthalpy of melting and $\Delta H_{f,cryst}$ is enthalpy of 100% crystalline sample = 146.6 J/g

Example 5c

Figure 10:
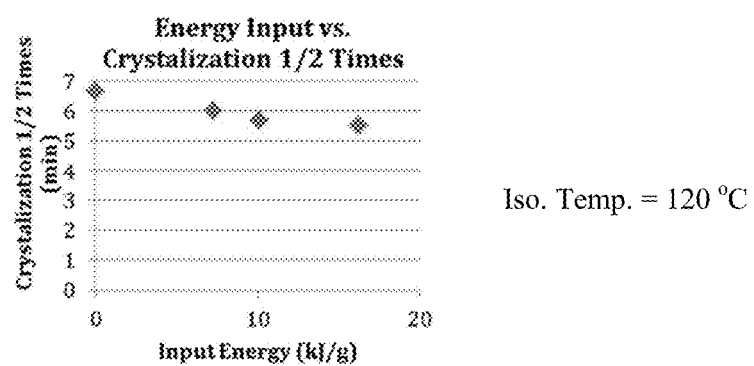

Isothermal results for SSSP only PHB samples. Reference is made to the date of FIG. 10.

Example 5d

Figure 11:
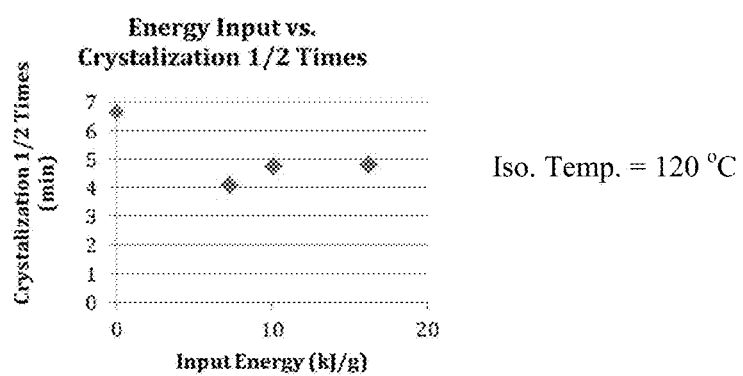

Isothermal results for SSSP/MM PHB samples. Reference is made to the data of FIG. 11.

Example 5e

TABLE 7

Figure 12:
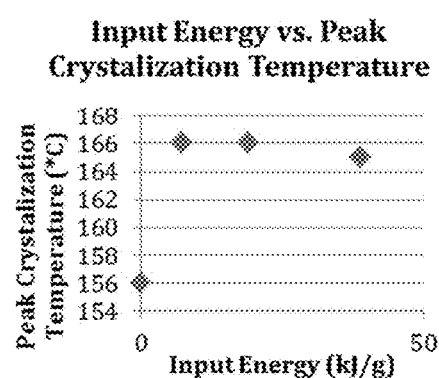

Non-Isothermal results for SSSP only nylon 11 samples. Reference is made to the data of FIG. 12.

| Name | Energy Input (kJ/g) | Crystallinity* (%) | Onset (° C.) | Peak (° C.) | Endset (° C.) |
|---|---|---|---|---|---|
| Pellet | 0 | 24.1 | 164 | 156 | 151 |
| SSSP-mod. P209bs | 7.2 | 24.2 | 171 | 166 | 162 |
| SSSP-P209bs | 19.0 | 23.2 | 170 | 166 | 162 |
| SSSP-KW10 | 38.8 | 23.6 | 168 | 165 | 162 |

*Crystallinity = $\Delta H_f/\Delta H_{f,cryst}$ where $\Delta H_f$ is the enthalpy of melting and $\Delta H_{f,cryst}$ is enthalpy of 100% crystalline sample = 206 J/g

Example 5f

TABLE 8

Figure 13:
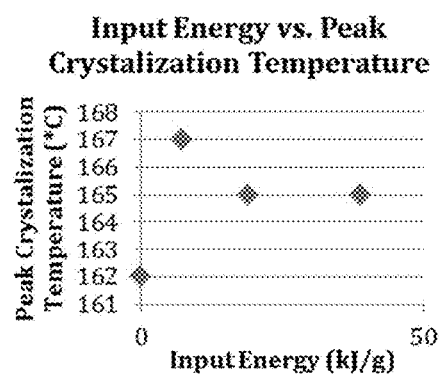

Non-Isothermal results for SSSP/MM nylon 11 samples. Reference is made to the data of FIG. 13.

| Name | Energy Input (kJ/g) | Crystallinity* (%) | Onset (° C.) | Peak (° C.) | Endset (° C.) |
|---|---|---|---|---|---|
| Pellet | 0 | 24.8 | 164 | 162 | 158 |
| SSSP-mod. P209bs | 7.2 | 24.6 | 171 | 167 | 162 |
| SSSP-P209bs | 19.0 | 24.2 | 169 | 165 | 162 |
| SSSP-KW10 | 38.8 | 24.5 | 167 | 164 | 161 |

*Crystallinity = $\Delta H_f/\Delta H_{f,cryst}$ where $\Delta H_f$ is the enthalpy of melting and $\Delta H_{f,cryst}$ is enthalpy of 100% crystalline sample = 206 J/g

Example 5g

Figure 14:
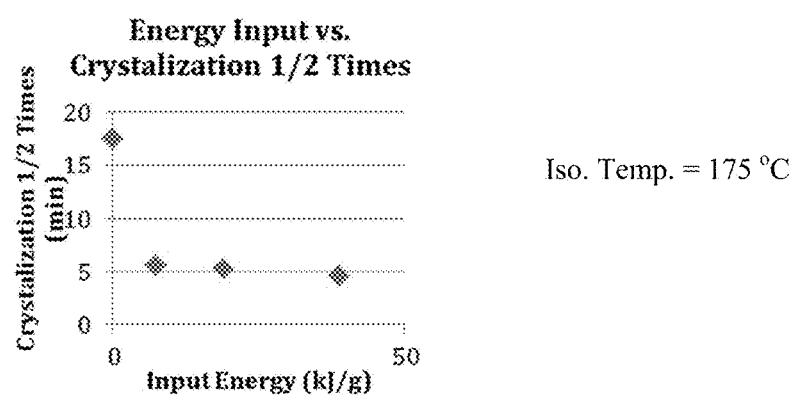

Isothermal results for SSSP only nylon 11 samples. Reference is made to the data of FIG. 14.

Example 5h

\* \* \*

Figure 15:
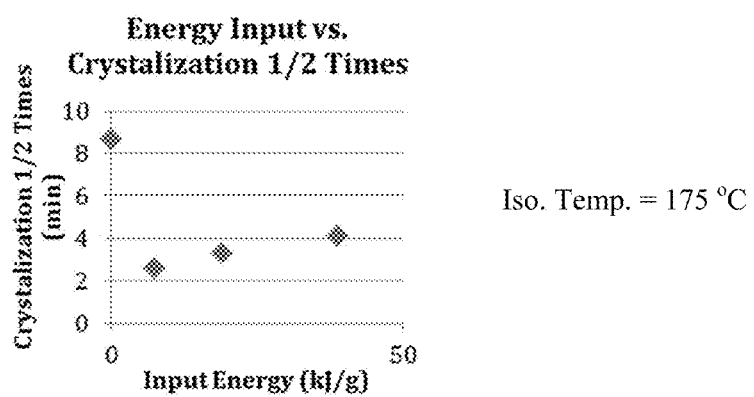

Isothermal results for SSSP/MM nylon 11 samples. Reference is made to the data of FIG. 15.

As demonstrated, solid-state shear pulverization processing of semi-crystalline homopolymers can result in the enhancement of the crystallization behavior. These enhancements can be accompanied by dramatic increases in the physical and/or mechanical properties of the polymer such as increased melt viscosity, modulus and lower gas permeability. Using unique near ambient temperature chemistries associated with SSSP, reduction in gas permeability is achieved with enhanced crystallization kinetics. Use of SSSP in in conjunction with the present invention provides several advantages over existing technologies, including but not limited to:

The limitations of thermodynamics, viscosity, and degradation often encountered in melt processing of polymers are overcome; the use of hazardous solvents, which is a major requirement in achieving sustainability and promoting green chemistry, is eliminated; there is versatility by adjustment of screw design, screw speed, and zone temperatures, which all play major roles in adjusting the amount of work applied to the material during processing; the process is continuous, industrially scalable, and high throughput processing, which is advantageous over batch solid-state processing techniques like ball-milling; the process is economically feasible, as the price of producing 1 kg of material is on the same order of magnitude as melt-extrusion; the SSSP apparatus is low maintenance, easy to clean, and simple to operate; the issue of low thermal stability often encountered in the production of biocomposite materials is overcome, since mixing takes place at ambient temperatures, whereas processing of these materials above Tm leads to filler degradation and intense odors, which negatively impacts the mechanical properties or leads to the inability to produce the composite in the first place; multiple stages in production (e.g., of natural fibers/polymer composites) are eliminated by simply breaking up and dispersing the filler with the polymer in one step; and heterogeneous nucleating agents naturally present in a polymer are effectively and efficiently dispersed.

We claim:

1. A method of processing a semi-crystalline homopolymer, said method comprising:
   providing a solid semi-crystalline homopolymer component, said homopolymer a single homopolymer comprising less than about 50% crystallinity; and
   applying a mechanical energy to said single homopolymer through solid-state shear pulverization in the presence of cooling at least partially sufficient to maintain said homopolymer in a solid state during said pulverization, said pulverization at least partially sufficient to induce at least one of polymer scission and indigenous nucleation sites within said homopolymer, wherein said single homopolymer is selected from polyesters, polyolefins and polyamides.

2. The method of claim 1 wherein said single homopolymer is a polyethylene.

3. A method of processing a semi-crystalline homopolymer, said method comprising:
   providing a solid semi-crystalline homopolymer component, said homopolymer a single homopolymer comprising less than about 50% crystallinity; and
   applying a mechanical energy to said single homopolymer through solid-state shear pulverization in the presence of cooling at least partially sufficient to maintain said homopolymer in a solid state during said pulverization, said pulverization at least partially sufficient to induce at least one of polymer scission and indigenous nucleation sites within said homopolymer, wherein said pulverized homopolymer is melt-processed.

4. A method of processing a semi-crystalline homopolymer, said method comprising:
   providing a solid semi-crystalline homopolymer component, said homopolymer a single homopolymer comprising less than about 50% crystallinity; and
   applying a mechanical energy to said single homopolymer through solid-state shear pulverization in the presence of cooling at least partially sufficient to maintain said homopolymer in a solid state during said pulverization, said pulverization at least partially sufficient to induce at least one of polymer scission and indigenous nucleation sites within said homopolymer, wherein said pulverized homopolymer is molded into a film, said film having decreased gas permeability as compared to a molded film of said single homopolymer component absent shear pulverization and further wherein said pulverized homopolymer is incorporated into an article of manufacture.

5. A method of affecting crystallization kinetics of a semi-crystalline homopolymer, said method comprising:
   providing a solid semi-crystalline homopolymer component, said homopolymer a single homopolymer comprising less than about 50% crystallinity; and
   applying a mechanical energy to said single homopolymer through solid-state shear pulverization in the presence of cooling at least partially sufficient to maintain said homopolymer in a solid state during said pulverization, said pulverization at least partially sufficient to induce at least one of an increased crystallization temperature and reduced isothermal crystallization half-time of said single homopolymer as compared to said single homopolymer absent shear pulverization, wherein said single homopolymer is a polyethylene.

6. A method of affecting crystallization kinetics of a semi-crystalline homopolymer, said method comprising:
   providing a solid semi-crystalline homopolymer component, said homopolymer a single homopolymer comprising less than about 50% crystallinity; and
   applying a mechanical energy to said single homopolymer through solid-state shear pulverization in the presence of cooling at least partially sufficient to maintain said homopolymer in a solid state during said pulverization, said pulverization at least partially sufficient to induce at least one of an increased crystallization temperature and reduced isothermal crystallization half-time of said single homopolymer as compared to said single homopolymer absent shear pulverization, wherein said pulverized homopolymer is melt-processed.

7. A method of affecting crystallization kinetics of a semi-crystalline homopolymer, said method comprising:
   providing a solid semi-crystalline homopolymer component, said homopolymer a single homopolymer comprising less than about 50% crystallinity; and
   applying a mechanical energy to said single homopolymer through solid-state shear pulverization in the presence of cooling at least partially sufficient to maintain said homopolymer in a solid state during said pulverization, said pulverization at least partially sufficient to induce at least one of an increased crystallization temperature and reduced isothermal crystallization half-time of said single homopolymer as compared to said single homopolymer absent shear pulverization, wherein said pulverized homopolymer is incorporated into an article of manufacture.

8. A method of using solid-state shear pulverization to affect crystallization kinetics of a semi-crystalline homopolymer, said method comprising:
   providing a solid semi-crystalline homopolymer component, said homopolymer component a single homopolymer, comprising less than about 50% crystallinity;
   introducing said single homopolymer into a solid-state shear pulverization apparatus, said apparatus comprising a cooling component at least partially sufficient to maintain said homopolymer in a solid state;
   shear pulverizing said single homopolymer, said pulverization at least partially efficient to affect at least one of a crystallization temperature and isothermal crystallization half-time of said single homopolymer, and said pulverization substantially absent at least one of a nucleating agent and a filler component; and
   discharging said shear pulverized single homopolymer from said apparatus, wherein said single homopolymer is a polyethylene.

9. A method of using solid-state shear pulverization to affect crystallization kinetics of a semi-crystalline homopolymer, said method comprising:

providing a solid semi-crystalline homopolymer component, said homopolymer component a single homopolymer, comprising less than about 50% crystallinity;

introducing said single homopolymer into a solid-state shear pulverization apparatus, said apparatus comprising a cooling component at least partially sufficient to maintain said homopolymer in a solid state;

shear pulverizing said single homopolymer, said pulverization at least partially efficient to affect at least one of a crystallization temperature and isothermal crystallization half-time of said single homopolymer, and said pulverization substantially absent at least one of a nucleating agent and a filler component; and discharging said shear pulverized single homopolymer from said apparatus, wherein said pulverized homopolymer is melt-processed.

10. A method of using solid-state shear pulverization to affect crystallization kinetics of a semi-crystalline homopolymer, said method comprising:

providing a solid semi-crystalline homopolymer component, said homopolymer component a single homopolymer, comprising less than about 50% crystallinity;

introducing said single homopolymer into a solid-state shear pulverization apparatus, said apparatus comprising a cooling component at least partially sufficient to maintain said homopolymer in a solid state;

shear pulverizing said single homopolymer, said pulverization at least partially efficient to affect at least one of a crystallization temperature and isothermal crystallization half-time of said single homopolymer, and said pulverization substantially absent at least one of a nucleating agent and a filler component; and discharging said shear pulverized single homopolymer from said apparatus, wherein said pulverized homopolymer is incorporated into an article of manufacture.

11. The method of claim 10 wherein said pulverized homopolymer is molded into a film, said film having decreased gas permeability as compared to a molded film of said single homopolymer component absent shear pulverization.

* * * * *